(12) United States Patent
Pyre

(10) Patent No.: US 6,619,668 B1
(45) Date of Patent: Sep. 16, 2003

(54) STATIC METAL GASKET AND METHOD OF MANUFACTURING IT

(75) Inventor: Alain Pyre, Saint Just (FR)

(73) Assignee: Societe Nationale d'Etude et de Construction de Moteurs d'Aviation - S.N.E.C.M.A., Paris (FR)

( * ) Notice: Subject to any disclaimer, the term of this patent is extended or adjusted under 35 U.S.C. 154(b) by 104 days.

(21) Appl. No.: 09/695,728

(22) Filed: Oct. 23, 2000

(30) Foreign Application Priority Data

Oct. 22, 1999 (FR) .............................................. 99 13188

(51) Int. Cl.[7] ................................................. F16J 15/02
(52) U.S. Cl. ........................ 277/644; 277/314; 277/608; 277/626
(58) Field of Search ................................. 277/314, 608, 277/614, 626, 643, 644

(56) References Cited

U.S. PATENT DOCUMENTS

| | | | | |
|---|---|---|---|---|
| 2,452,469 A | * | 10/1948 | Johnson | 277/608 |
| 3,285,632 A | | 11/1966 | Dunkle | |
| 3,630,553 A | * | 12/1971 | Foulger | 277/626 |
| 3,747,963 A | * | 7/1973 | Shivak | 277/626 |
| 4,056,682 A | * | 11/1977 | Havens et al. | 277/608 |
| 4,372,565 A | | 2/1983 | Lien | 277/236 |
| 4,854,600 A | * | 8/1989 | Halling et al. | 277/626 |
| 5,380,019 A | * | 1/1995 | Hillery et al. | 277/626 |
| 5,730,445 A | * | 3/1998 | Swensen et al. | 277/608 |
| 5,954,343 A | | 9/1999 | Sumida et al. | 277/434 |
| 6,209,884 B1 | * | 4/2001 | Taudt | 277/626 |
| 6,322,087 B1 | * | 11/2001 | Swensen et al. | 277/608 |

FOREIGN PATENT DOCUMENTS

| | | |
|---|---|---|
| DE | 1195 03 321 | 1/1996 |
| FR | 2036502 | 12/1970 |
| FR | 2258584 | 8/1975 |
| FR | 2606486 | 5/1988 |

* cited by examiner

*Primary Examiner*—Anthony Knight
*Assistant Examiner*—Chris Boswell
(74) *Attorney, Agent, or Firm*—Weingarten, Schurgin, Gagnebin & Lebovici LLP

(57) ABSTRACT

The metal static gasket forms an annular body about an axis ZZ'. The profile of the gasket in axial half-section presents an elongated S-shape and comprises a lateral first portion defining the inner peripheral surface of the gasket, a lateral second portion defining the outer peripheral surface of the gasket, said lateral first and second portions being offset from each other along the direction of the axis of the gasket. The gasket also presents a curved third portion of undulating shape having a substantially rectilinear first contact region at one of its ends, and a curved fourth portion of undulating shape having a substantially rectilinear second contact region at one of its end extending perpendicularly to the axis of the gasket in such a manner that the gasket provides sealing between two flanges solely by means of the axial pressure exerted by the flanges.

14 Claims, 2 Drawing Sheets

STATIC METAL GASKET AND METHOD OF MANUFACTURING IT

FIELD OF THE INVENTION

The present invention relates to a metal static gasket forming an annular body about an axis ZZ'.

The invention relates more particularly to gaskets for providing sealing under very difficult conditions of use. Such gaskets can withstand temperatures that are very high or very low, and fluid pressures that are extreme, and they can also withstand large mechanical forces.

PRIOR ART

High performance static gaskets used in such environments are already known, in particular from documents FR 2 726 879 and FR 2 757 923.

Gaskets of that type all rely on the same principle: deformation of a channel-section profile.

FIG. 5 shows an example of a prior art channel-section gasket 40. The gasket 40 comprises an annular body 47 about an axis ZZ', which body is extended laterally by lips 42 and 43 which are themselves associated with end portions 44 and 45 that define the contact surfaces of the gasket 10. Sealing is achieved by compressing the end portions 44, 45 between two flanges (not shown). Profiles of that type have been developed to present a large amount of usable restitution (where usable restitution is the maximum axially-symmetrical opening between the bearing faces of the housing for the gasket that the gasket can accommodate without leaking) for a small size of profile. Although such gaskets present characteristics that are satisfactory concerning performance and lifetime, they are nevertheless relatively difficult to manufacture because of the problems encountered when machining (turning) profiles of very small dimensions.

Very tight manufacturing tolerances contribute to make such gaskets relatively expensive.

OBJECT AND BRIEF SUMMARY OF THE INVENTION

The invention seeks to remedy the above-mentioned drawbacks and to provide a gasket which presents manufacturing tolerances that are less tight than those in the prior art so as to enable such a gasket to be made using "mass production" techniques.

The invention seeks to provide a static gasket which presents usable restitution that is equivalent to or greater than that of channel-section static gaskets for a profile of the same size.

The invention also seeks to provide a static gasket which presents excellent qualities in terms of mechanical strength, materials compatibility with the fluids and the surrounding materials, and tolerance to severe conditions of use such as vast temperature or pressure ranges.

These objects are achieved by a metal static gasket forming an annular body about an axis ZZ', the profile of the gasket in axial half-section being an elongated S-shape and comprising a lateral first portion which defines the inner peripheral surface of the gasket, a lateral second portion which defines the outer peripheral surface of the gasket, said lateral first and second portions being offset from each other in the axial direction of the gasket, and curved third and fourth portions of undulating shape, wherein the curved third portion of undulating shape has, at one of its ends, a first contact region that is substantially rectilinear and extends perpendicularly to the axis of the gasket and that is connected to one of the ends of the lateral second portion, and wherein the curved fourth portion of undulating shape has, at one of its ends, a second contact region that is substantially rectilinear and extends perpendicularly to the axis of the gasket, and that is connected to one of the ends of the lateral first portion.

The invention thus provides a metal static gasket of design that is simpler than that of the gaskets that have been developed in the prior art, but which presents sealing performance that is equivalent or better. In particular, the shape of the profile of the gasket of the invention presents dimensional characteristics that are adapted to the presently-existing housings for receiving gaskets of larger profile. With smaller profile, the gasket of the invention presents usable restitution that is equivalent to that of gaskets having a channel-section profile, and they do so at smaller axial compression force. This potentially improves the tightening of the connections between which the gasket is placed without it being necessary to exert any radial force on the gasket.

The shape of the profile of the gasket of the invention ensures that contact with and pressure on the sealing tracks provides high performance, capable of satisfying the severe requirements expected of gaskets of very small dimensions.

According to a feature of the present invention, the lateral first and second portions are rectilinear and extend parallel to the axis of the gasket.

In an embodiment, the third and fourth portions of undulating shape are upwardly sloping from the inside circumference towards the outside circumference of the gasket.

In another embodiment, the third and fourth portions of undulating shape are downwardly sloping from the inside circumference towards the outside circumference of the gasket.

More particularly, the gasket of the invention may be constituted by a metal substrate of thickness lying in the range 1.4 mm to 1.6 mm.

In a particular embodiment, its height without any coating lies in the range 2.45 mm to 2.65 mm.

Advantageously, the gasket of the invention is coated in a layer of silver of thickness less than or equal to 0.04 mm.

In particular, the gasket of the invention may be made to have small dimensions, for example an inside diameter of about 16.5 mm and an outside diameter of about 21 mm.

According to another particular characteristic, the gasket can be constituted by an Inconel substrate.

The invention also provides a method of manufacturing a metal static gasket, the method comprising the steps of: cutting out an annular body from a sheet of metal or alloy; holding an outer peripheral portion of the annular body in a press constituted by a punch, a die, and a clamp, the outer portion being held between the die and the clamp in a plane extending perpendicularly to the axis of the ring; and causing the punch to advance against an inner peripheral portion of the annular body in such a manner that said annular body, when deformed in this way, presents an elongated S-shape in axial half-section.

The invention thus provides a "gentle embossing" method of manufacture which considerably simplifies manufacture of the gasket while retaining the required performance for the gasket. The method of manufacture of the invention thus considerably improves the reliability of gaskets manufactured using this method. The difficult operations of turning very small gaskets are avoided, thereby reducing risks during manufacture. The small bending angles due to the gentle embossing make it possible to conserve good mechanical strength and considerable usable restitution for the gasket. The manufacturing method of the invention also makes it possible to use "mass production" production techniques.

According to a particular characteristic, the method further comprises a step consisting in covering said annular body in a coating material.

Advantageously, the coating material is constituted by a layer of silver having a maximum thickness of 0.04 mm.

According to another particular characteristic, said metal or alloy sheet is constituted by Inconel having a thickness lying in the range 0.6 mm to 5 mm.

The method of manufacture of the invention is compatible in general with all types of metal and alloy for which the breaking elongation of the material is greater than 30%.

BRIEF DESCRIPTION OF THE DRAWINGS

Other characteristics and advantages of the invention appear from the following description of particular embodiments, given with reference to the accompanying drawings, in which.

DETAILED DESCRIPTION OF PARTICULAR EMBODIMENTS

The gasket described as an embodiment in the present description is of small size. Nevertheless, the invention also applies to gaskets of greater dimensions and larger size, in which case the performance of the gasket will be better than that described in the present description.

Figure 1:
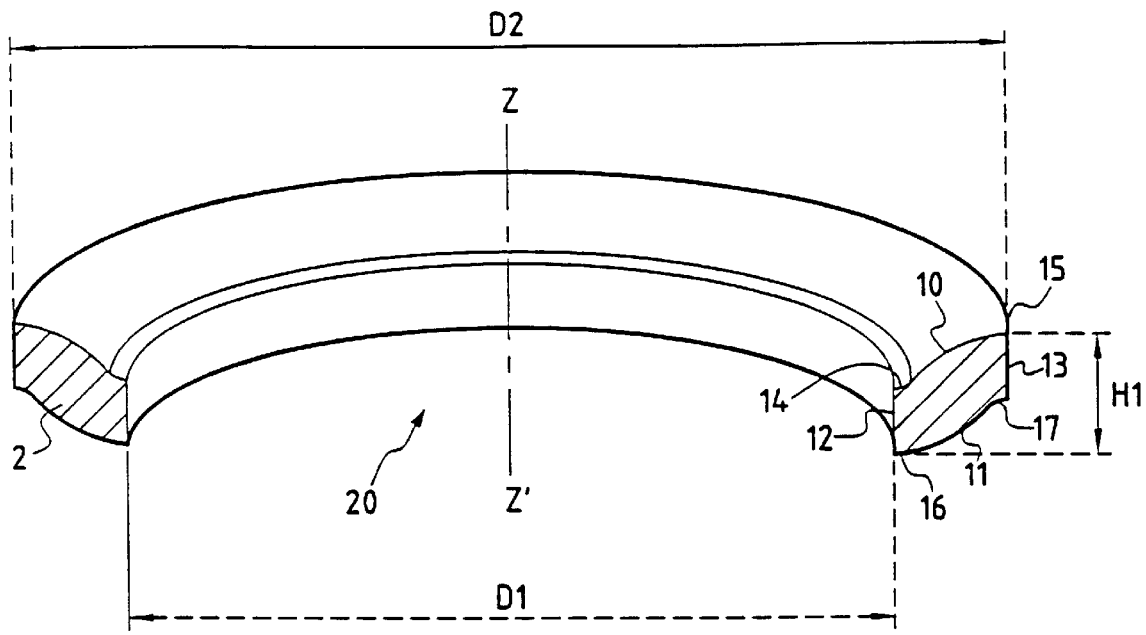
FIG. 1 is a half-view (section) in perspective of an example of a static gasket of the invention.
Figure 2:
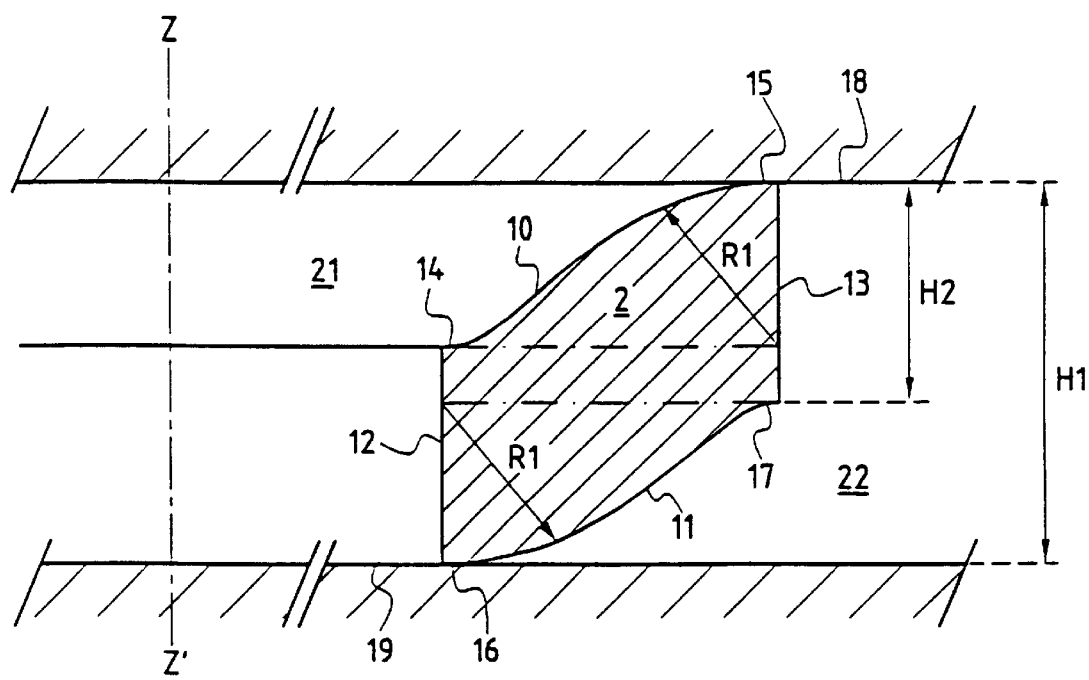
FIG. 2 is an axial half-section view of an example of a static gasket of the invention.

FIG. 1 shows the general appearance of a gasket 20 of the invention which comprises an annular body 2 about an axis ZZ', the body being in the form of an upward undulation going from its inside circumference towards its outside circumference, so that the gasket 20 thus defines an elongated S-shape in axial half-section (FIG. 2). In the drawings, a gasket 20 is shown whose undulation goes up from the center towards the periphery of the gasket. Nevertheless, the invention applies equally well to embodiments in which the annular body presents an undulation that goes down from the inside circumference towards the outside circumference of the gasket.

The gasket 20 shown in FIG. 1 is intended to provide internal and external sealing when it is held between a plane 18 and a plane 20 that are shown in FIG. 2. When the gasket 20 is compressed between the plane 18 and the plane 19, a space 21 defined by the planes 18 and 19 and the inside periphery of the gasket is hermetically isolated from a space 22 defined between the planes 18 and 19 and the outside periphery of the gasket 20. Thus, a fluid under pressure circulating through the space 21 cannot penetrate into the space 22, and vice versa.

The gasket 20 has a lateral first portion 12 parallel to the axis ZZ' of the gasket and defining part of the inside peripheral surface of the gasket. The gasket also has a lateral second portion 13 parallel to the axis ZZ' of the gasket and defining part of the outside peripheral surface of the gasket. These lateral first and second portions 12 and 13 are offset relative to each other along the direction of the axis ZZ'. A curved third portion 10 interconnects the top ends of the lateral portions 12, 13 and presents an elongated S-shape, as does a curved fourth portion 11 that is substantially parallel to the curved third portion 10 and that connects together the bottom ends of the lateral portions 12, 13.

The curved third and fourth portions 10, 11 have substantially rectilinear regions 14, 15 and 16, 17 at their respective ends. The regions 14, 15 and 16, 17 extend perpendicularly to the axis ZZ' of the gasket 20. These substantially rectilinear regions, and in particular the regions 16 and 15 in the configuration shown in FIG. 2 which come into contact respectively with the planes 18 and 19, serve to provide the contact width that is required between the gasket 20 and the planes 19, 20 in order to provide sealing. Consequently, the gasket of the present invention provides sealing between the spaces 21 and 22 solely by the gasket being compressed axially along the axis ZZ'. Thus, the gasket of the invention presents the advantage of not developing radial contact forces between the gasket and its housing. Under such conditions, it is therefore always easy to extract the gasket after testing.

The gasket 20 has an inside diameter D1 and an outside diameter D2. The configuration of the gasket of the invention is particularly suitable for making gaskets of small dimensions for which mechanical constraints are considerable, however the gasket can also be made to larger dimensions. The dimensions given below by way of example relate to embodiments of very small gaskets since they are the gaskets with which it is the most difficult to obtain good sealing. Consequently, the person skilled in the art will have little difficulty in extending these embodiments to larger dimensions where they will naturally provide improved performance. The fact that the gasket of the invention does not bear readily against the planes or flanges 18 and 19 when they are urged towards each other means that to obtain axial reaction compatible with the intended sealing performance, it is necessary for the gasket to be thick-set in profile. In other words, the ratio H1/(D2-D1) of the total thickness H1 of the gasket profile over the width of the gasket profile (D2-D1) should be close to 0.5.

As an example of small dimensions, the gasket can have a mean diameter lying in the range 15 mm to 25 mm, e.g. with an inside diameter D1 of about 16.5 mm and an outside diameter D2 of about 21 mm. The gasket 20 can be made using a metal or alloy substrate having a thickness without coating H2 that lies in the range 1.4 mm to 1.6 mm so that after forming it presents a height H1 lying in the range 2.45 mm to 2.65 mm. Preferably, the radius of curvature R1 of the profile is not less than 0.5 mm. Housings adapted to receive such a gasket are defined by a compression range between the planes 18 and 19 of 0.19 mm to 0.45 mm. Under such circumstances, the nominal compression applied to the gasket is 0.35 mm. These various parameters have been used to evaluate the sealing performance of a gasket 20 of the invention. At nominal compression of 0.35 mm, the gasket 20 of the invention presents usable restitution of about 0.066 mm and a compression force of about 9.15 daN/mm of circumference. The gasket 20 of the invention thus presents usable restitution equivalent to that obtained with a channel-section gasket but at lower compression force. This means that greater tolerance can be allowed in the extent to which the gasket is clamped between the clamping planes 18 and 19.

The profile with the elongated S-shape presented by the gasket 20 in axial half-section, as shown in FIG. 2, is particularly suited to relatively high fluid pressures in the spaces 21 and/or 22. For fluid pressures of less than 100 bars, the usable restitution of the gasket lies in the range 0.05 mm to 0.078 mm.

A pressurized fluid circulating in the space 21 exerts pressure on the lateral first portion 12 and on the curved third portion 10. The region 15 is unloaded relative to the region 16 which is loaded by the fluid pressure present in the space 21. The maximum contact width can then be about 0.07 mm, compared with a maximum contact width of about 0.1 mm when the gasket is not subjected to fluid pressure.

Figure 3:
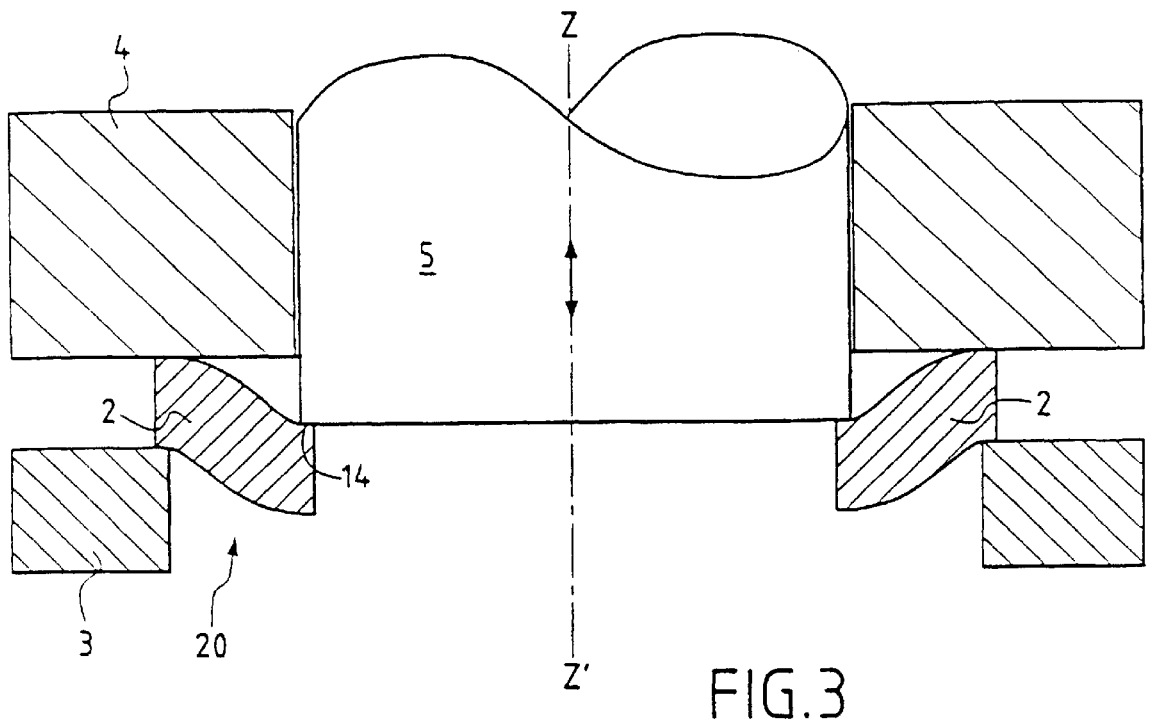
FIG. 3 is an axial section view showing the method of forming a static gasket of the invention.
Figure 5:
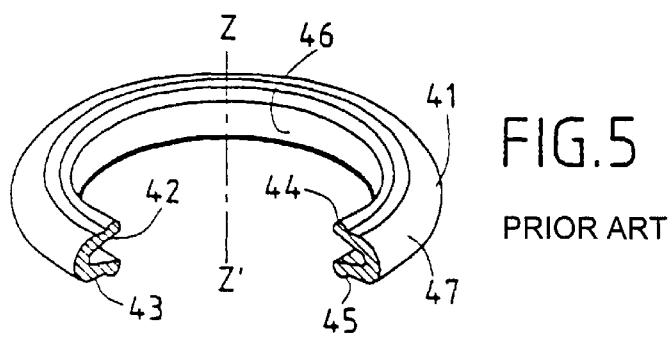
FIG. 5 is a three-quarters (section) in perspective showing an example of a prior art channel-section gasket.

FIG. 3 shows the method of manufacturing the gasket 20 of the invention. An annular body 2 is cut out from a sheet of metal or alloy. The annular body 2 can be made out of "Inconel 718", for example. The annular body 2 is then held in a press constituted by a punch 5, a die 3, and a clamp 4. The annular body 2 is then held by its outer peripheral portion between the die 3 in contact with the bottom transverse portion of the annular body 2 and the clamp 4 in contact with the top transverse portion of the annular body 2. The following step consists in advancing the punch 5 against a region 14 of the inner periphery of the annular body 2. The depth to which the punch 5 penetrates into the annular body 2 defines the radius of curvature R1 of the profile of the resulting gasket 20, and consequently defines the height of the gasket after a small amount of forming or embossing. The clamp 4 prevents bends being formed due to the annular body 2 moving radially as the punch advances into the material of the body.

This embossing type method of manufacture provides relatively great tolerance as to the materials used. In general, any metal or alloy in sheet form is compatible with this method of manufacture providing its breaking elongation is greater than 30%.

The method of the invention can include an additional step consisting in covering the annular body 2 in a coating material which can be constituted, for example, by a layer of silver that is about 0.02 mm to 0.05 mm thick and that is made by electroplating. This range of values can naturally be modified with gaskets of larger dimensions. The annular body can also be covered in some other type of coating, for example "Teflon", nickel, gold, or a nickel and silver combination.

The annular body 2 can be made of Inconel 718. In which case the thickness of the annular body 2 can lie in the range 0.6 mm to 5 mm. To manufacture gaskets with a thicker annular body, it is possible to use other materials that are less expensive, such as stainless steel, for making the annular body 2.

The method of the invention thus corresponds to a manufacturing technique of the "gentle embossing" type which considerably simplifies mass production of gaskets of this type. In contrast, it is also possible to make the gasket by turning, as is used for prior art static gaskets. When using a turning technique, the cost of manufacture will be higher, although still lower than that required for making presently known gaskets. Furthermore, using a turning technique to make a gasket of the invention will provide a gasket having better performance since the usable restitution of the gasket is slightly dimensioned by the embossing process.

The gasket 20 of the invention is suitable for operating under severe conditions of use such as those encountered in the aerospace field. The range of temperatures to which the gasket can be exposed runs from 20 K to 930 K. Fluids such as $LH_2$, $LOx$, $LN_2$, $GHe$, and $(H_2+O_2)$ combustion gases are compatible with the materials constituting the gasket. The gasket 20 of the invention provides, in particular, materials compatibility with the fluids encountered by the prior art high performance gaskets described in documents FR 2 726 879 and FR 2 757 923.

For fluid pressures going up to 100 bars, the gasket likewise provides very high performance in particular in terms of usable restitution.

At higher pressures, it is still possible to use the gasket, but under such circumstances, it presents less usable restitution. For use at very high pressures, where usable restitution is still required, the gasket housing can be positioned so that the gasket comes naturally to bear radially against the housing under the effect of the pressure. Under such conditions, it is possible to go up to very high pressures while retaining good performance.

Figure 4:
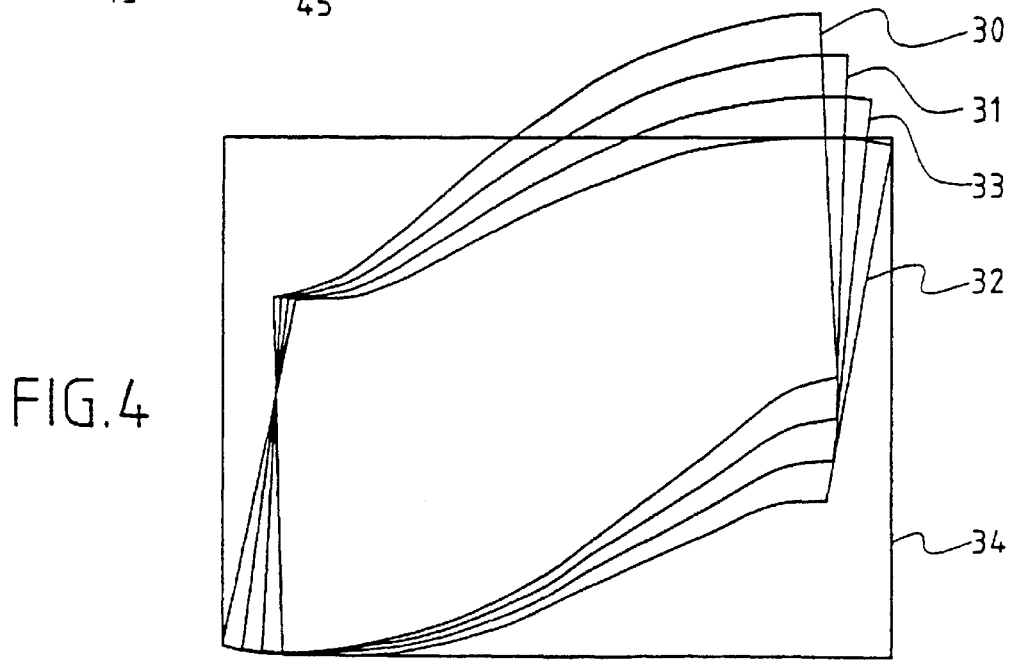
FIG. 4 is an axial half-section view of an example of various loaded and unloaded states of a static gasket of the invention.

FIG. 4 shows the various shapes that can be taken up by the gasket during manufacture and in use. The frame 34 represents a housing for the gasket when it is at nominal compression. The profile 30 represents the shape of the gasket profile as seen in axial half-section when the force from the punch is at its maximum. The profile 31 shows the shape of the gasket after it has been formed or embossed. The profile 32 shows nominal compression of the gasket, and the profile 33 shows the shape of the gasket when fully unloaded.

What is claimed is:

1. A metal static gasket for sealing axially flange facing surfaces when said metal static gasket is axially compressed between said flange facing surfaces, said gasket forming an annular body about an axis ZZ', the profile of the gasket in axial half-section being an elongated S-shape and comprising a lateral first portion which defines the inner peripheral surface of the gasket, a lateral second portion which defines the outer peripheral surface of the gasket, said lateral first and second portions being offset from each other in the axial direction of the gasket, and longitudinal third and fourth portions forming an arc, wherein the arcuated third portion has, at one of its ends, a first contract region that is substantially rectilinear and extends perpendicularly to the axis of the gasket and that is connected to one of the ends of the lateral second portion, and the arcuated fourth portion of has, at one of its ends, a second contact region that is substantially rectilinear and extends perpendicularly to the axis of the gasket, and that is connected to one of the ends of the lateral first portion so that the contact areas between said gasket and said flange facing surfaces occur only in said first and second substantially rectilinear contact regions, no contract occurring in said lateral first and second portions of said gasket.

2. A gasket according to claim 1, wherein the lateral first and second portions are rectilinear and extend parallel to the axis of the gasket.

3. A gasket according to claim 1, wherein the third and fourth portions of undulating shape are upwardly sloping from the inside circumference towards the outside circumference of the gasket.

4. A gasket according to claim 1, wherein the third and fourth portions of undulating shape are downwardly sloping from the inside circumference towards the outside circumference of the gasket.

5. A gasket according to claim 1, the gasket being constituted by a metal substrate of thickness lying in the range 1.4 mm to 1.6 mm.

6. A gasket according to claim 1 wherein the gasket height without any coating lies in the range of 2.45 mm to 2.65 mm.

7. A gasket according to claim 1, the gasket being coated in a layer of silver of thickness less than or equal to 0.04 mm.

8. A gasket according to claim 1 wherein the gasket mean diameter lies in the range of about 15 mm to 25 mm.

9. A gasket according to claim 1, having an inside diameter of about 16.5 mm, and an outside diameter of about 21 mm.

10. A gasket according to claim 1, the gasket being constitued by a substrate selected from the group of a nickel-chromium alloy, nickel-chromium-iron alloy, and nickel-chromium-niobium-iron-molybdenum alloy.

11. A method of manufacturing a metal static gasket, the method comprising the following steps:

a) cutting out an annular body from a sheet of metal or alloy;

b) holding an outer peripheral portion of the annular body in a press constituted by a punch, a die, and a clamp, the outer portion being held between the die and the clamp in a plane extending perpendicularly to the axis of the ring; and c) causing the punch to advance against an inner peripheral region of the annular body in such a manner that said annular body, when deformed in this way, presents an elongated S-shape in axial half-section.

12. A method according to claim 11, further comprising a step consisting in covering said annular body in a coating material.

13. A method according to claim 12, wherein the coating material is constituted by a layer of silver having a maximum thickness of 0.04 mm.

14. A method according to claim 11, wherein said metal or alloy sheet is constituted by one selected from the group of a nickel-chromium alloy, nickel-chromium-iron alloy, and nickel-chromium-niobium-iron-molybdenum alloy having a thickness lying lying in the range of 0.6 mm to 5 mm.

\* \* \* \* \*